Patented Nov. 14, 1944

2,362,825

UNITED STATES PATENT OFFICE 2,362,825

REFRACTORY MATERIAL AND METHOD OF MAKING

Otis Hutchins, Niagara Falls, N. Y., assignor to The Carborundum Company, Niagara Falls, N. Y., a corporation of Delaware No Drawing. Application February 1, 1941, Serial No. 377,020

3 Claims. (Cl. 106—65)

This invention relates to artificially fused masses or material, and particularly to refractory mullite material formed by fusion in an electric furnace, and to a method of making said material.

The present invention has as its object the provision of an improved type of fused mullite which is especially suitable for refractory purposes. Mullite material has heretofore been characterized by the presence in the fused mass of substantial percentages of matter extraneous to the mullite crystal phase; the amount sometimes reaches as high as 50% or more of the fused mass. Sometimes this foreign material is largely glass, whereas in other cases other crystalline phases such as corundum or other forms of alumina or the like, while not predominant are present to a substantial degree. For example, in fusions of alumina and silica in masses approximating 3000 pounds in weight in an electric furnace of the type set forth in my U. S. Patent 1,310,341 the fused mass cooled to the point of solidification in such a furnace in about three hours. The resulting pig is found to have around 20% glass present and is not as refractory as desired. Fusion of masses around 2000 pounds in weight similarly yield a product having a glass content of about 55%.

It is a purpose of the present invention to provide a fused refractory mullite material in which the mullite crystalline phase not only predominates but constitutes over 90% of the entire mass. Moreover, the extraneous matter is present in such a way and of such form as to have a minimum effect upon the refractoriness of the mullite crystals. The crystals of mullite in the present product are furthermore allowed to develop to the fullest possible extent, so much so that the fused mass possesses a fibrous macrostructure of large, interwoven mullite crystals.

In accordance with the present invention, an improved artificial or electric furnace mullite is made by fusing a mixture of calcined bauxite and silica in an electric furnace. The alumina-silica ratio of the mixture closely approaches the true theoretical mullite ratio of 72 parts of alumina to 28 parts of silica. In the selection of suitable raw materials the bauxite chosen is preferably a calcined highly siliceous bauxite containing approximately 18 to 20% silica. The bauxite is brought to the alumina-silica ratio of mullite by the addition of sufficient amounts of a highly pure silica sand.

A bauxite of the high-silica type which has been found highly satisfactory in carrying out the present invention shows the following chemical analysis:

| | Percent |
|---|---|
| $Al_2O_3$ | 74.75 |
| $SiO_2$ | 19.22 |
| $Fe_2O_3$ | 3.15 |
| $TiO_2$ | 2.58 |
| Ignition loss | .20 |
| CaO | .10 |

As an example of a suitable raw batch for fusions in accordance with the present invention, a mixture of bauxite of the above type and a pure silica sand is made in the following proportions:

| | Parts by weight |
|---|---|
| Bauxite | 10,000 |
| Silica sand | 1,110 |

Although a mixture of bauxite and silica sand has been found to give most satisfactory results and is set forth herein by example, mixtures of other raw materials which are sources of alumina and silica, may be used to provide the necessary mullite composition for fusion. Other raw materials which may be so used when suitably proportioned include scrap alumina fines available from the production of abrasive grain, kaolin, and other natural alumina- and silica-containing minerals.

Any ordinary form of arc furnace with vertical electrodes depending into the furnace pot or chamber is suitable for carrying out this process. A furnace of the type set forth in my earlier U. S. Patent 1,310,341 is suitable, providing it is of a size which will hold upwards of 8000 pounds of molten material. The charge mixture is fed into the furnace around the electrodes, and as the mixture of raw materials becomes fused and builds up under the arc the electrodes are raised to allow the fused mass to form a pig or ingot of considerable size. After a sufficient amount of mixture has been smelted to form an ingot of suitable size, the furnace run is stopped and the fused mass is allowed to cool slowly. It is an essential and important feature of the present process that the raw materials are fused in large enough quantities to form huge ingots of considerable bulk or weight which will not cool rapidly. Satisfactory results have been obtained with fused ingots having a bulk weight in the neighborhood of 12 to 14 thousand pounds of completely fused material. However, reasonably satisfactory results can be had with the fusion of batches as low as 5,000 pounds or thereabouts although it is better to carry out the fusions on as large a scale as is conveniently possible.

It is particularly pointed out that in order to obtain a refractory mullite material as herein described it is essential that the molten fused mass be cooled down very slowly to the point of solidification. It is recommended that cooling of the molten fused material to a solid condition should extend over a period of from 6 to 8 hours, this duration of time being essential for the full development of large mullite crystals and a minimum of glass or other extraneous matter. When ingots of fused material in the neighborhood of 8,000 pounds or upward are formed it is found that the rate of cooling will be satisfactorily within the above range.

The fused mass formed in the above described manner when cooled is found to consist essentially of a single crystalline phase of large, fully developed, elongated mullite crystals which can be readily identified as such when examined macroscopically. The macrostructure may be described as fibrous in appearance with a large portion of the primary mullite crystals interwoven into a dense mass but oriented substantially parallel to one another along their long axes and fully developed to a large size. The mullite content of the fused mass is high and amounts to over 90% by weight, usually over 95%, of the entire body, most of the mullite being present in the form of the long, fully developed crystals described above with a slight additional amount of secondary finely crystalline mullite dispersed about the remaining or extraneous matter.

Petrographic thin sections of the material made parallel to the length of the large mullite crystals indicate that the only appreciable accessory mineral is ilmenite ($FeTiO_3$). When thin sections in this same direction are examined the mass appears to be free of glass but examination of thin sections made taking a cross section of the crystals shows that glass is present but in the section taken longitudinally of the mullite crystals the glass has been masked by the opaque ilmenite dendrites.

The accessory ilmenite occurs in two generations, the primary crystals which are well enclosed in the large mullite crystals, and the secondary crystals which occur together with glass and the secondary mullite in the interstices between the large mullite crystals. It is pointed out that the existence of a large part of the ilmenite within the mullite crystals is favorable to the refractoriness of the fused mass and is a desirable characteristic.

Petrographic analysis of the new mullite, based upon petrographic powder count methods, show the constituents of the fused mass quantitatively to be approximately as follows:

| | Per cent |
|---|---|
| Mullite crystals | 90–95 |
| Ilmenite ($FeTiO_3$) | 3–7 |
| Glass | Less than 5 |

The mullite as hereby produced is characterized by its unusually high mullite crystalline content and its relative freedom from any other crystalline phase. The ilmenite and glass identified petrographically is referred to as extraneous matter. The presence of ilmenite is further identified as being present by the results of chemical analysis of the fused mass which shows the presence of small amounts of iron oxide and titanium oxide.

By reason of the high mullite crystal content and the low amount of glass and other extraneous matter found in the product of the present invention it is particularly adapted for refractory usage and shows a longer life when so used. An additional advantage of the present grain occurs because of the tendency of the mass to separate or break into cubes when crushed, resulting in a blockier grain than usual, which factor, no doubt, serves to further enhance its value as a refractory material.

Having described in detail the present product and the method by which it is made, it is desired to claim:

1. A method of making a refractory mullite material having a low glass content which comprises fusing a mixture of silica and calcined bauxite in approximately the alumina-silica ratio of 72 parts by weight of alumina to 28 parts by weight of silica in an electric furnace until the amount of fused material is greater than 5000 pounds by weight, and slowly cooling the fused mass over a period of at least six hours to form a solidified fused mass of mullite refractory material containing less than 10% glass, the macrostructure of said mass being predominantly large needle-like mullite crystals lying with their long axes substantially parallel to one another.

2. A method of making a refractory mullite material having a low glass content which comprises fusing a mixture of silica and fused alumina in approximately the alumina-silica ratio of 72 parts by weight of alumina to 28 parts by weight of silica in an electric furnace until the amount of fused material is greater than 5000 pounds by weight, and slowly cooling the fused mass over a period of at least six hours to form a solidified fused mass of mullite refractory material containing less than 10% glass, the macrostructure of said mass being predominantly large needlelike mullite crystals lying with their long axes substantially parallel to one another.

3. A method of making a refractory mullite material having a low glass content which comprises fusing a mixture of silica and an aluminous material selected from the group consisting of fused alumina and calcined bauxite in approximately the alumina-silica ratio of 72 parts by weight of alumina to 28 parts by weight of silica in an electric furnace until the amount of fused material is greater than 5000 pounds by weight, and slowly cooling the fused mass over a period of at least six hours to form a solidified fused mass of mullite refractory material containing less than 10% glass, the macrostructure of said mass being predominantly large needle-like mullite crystals lying with their long axes substantially parallel to one another.

OTIS HUTCHINS.